US010655784B2

(12) United States Patent
Fujisawa et al.

(10) Patent No.: US 10,655,784 B2
(45) Date of Patent: May 19, 2020

(54) GAS SUPPLY DEVICE AND GAS SUPPLY METHOD

(71) Applicant: Kobe Steel, Ltd., Hyogo (JP)

(72) Inventors: Akitoshi Fujisawa, Kobe (JP); Kenji Nagura, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 100 days.

(21) Appl. No.: 15/763,979

(22) PCT Filed: Sep. 30, 2016

(86) PCT No.: PCT/JP2016/079049
§ 371 (c)(1),
(2) Date: Mar. 28, 2018

(87) PCT Pub. No.: WO2017/057688
PCT Pub. Date: Apr. 6, 2017

(65) Prior Publication Data
US 2018/0306381 A1 Oct. 25, 2018

(30) Foreign Application Priority Data

Oct. 2, 2015 (JP) ................................. 2015-197057

(51) Int. Cl.
*F17C 7/04* (2006.01)
*F17C 5/06* (2006.01)
(Continued)

(52) U.S. Cl.
CPC .................. *F17C 5/06* (2013.01); *B67D 7/58* (2013.01); *B67D 7/78* (2013.01); *F17C 7/04* (2013.01);
(Continued)

(58) Field of Classification Search
CPC ...... F17C 5/06; F17C 7/04; F17C 9/04; F17C 2205/326; F17C 2221/012;
(Continued)

(56) References Cited

U.S. PATENT DOCUMENTS 4,315,407 A * 2/1982 Creed ..................... F17C 9/04
62/50.2
9,494,281 B2 * 11/2016 Chalk ..................... F17C 5/02
(Continued)

FOREIGN PATENT DOCUMENTS

DE 202013101593 U1 4/2013
JP S51-15558 A 2/1976
(Continued)

OTHER PUBLICATIONS

English translation of International Preliminary Report on Patentability issued in corresponding International Application No. PCT/JP2016/079049; dated Apr. 12, 2018.
(Continued)

*Primary Examiner* — Matthew W Jellett
(74) *Attorney, Agent, or Firm* — Studebaker & Brackett PC (57) ABSTRACT

A gas supply device includes a storage container that accumulates liquefied gas, a vaporizer for vaporizing liquefied gas derived from the storage container, a compression device that compresses gas vaporized from the liquefied gas in the vaporizer, a pressure accumulator that accumulates gas compressed in the compression device, and a supply path linked to a dispenser from the pressure accumulator.

11 Claims, 5 Drawing Sheets

(51) Int. Cl.
*F17C 9/04* (2006.01)
*B67D 7/58* (2010.01)
*B67D 7/78* (2010.01)

(52) U.S. Cl.
CPC ........ *F17C 9/04* (2013.01); *F17C 2205/0326* (2013.01); *F17C 2221/012* (2013.01); *F17C 2223/0153* (2013.01); *F17C 2223/033* (2013.01); *F17C 2223/043* (2013.01); *F17C 2223/046* (2013.01); *F17C 2225/0123* (2013.01); *F17C 2225/036* (2013.01); *F17C 2227/0157* (2013.01); *F17C 2227/0164* (2013.01); *F17C 2227/0323* (2013.01); *F17C 2227/0353* (2013.01); *F17C 2227/0355* (2013.01); *F17C 2227/0388* (2013.01); *F17C 2227/0393* (2013.01); *F17C 2250/01* (2013.01); *F17C 2250/043* (2013.01); *F17C 2250/0439* (2013.01); *F17C 2250/0636* (2013.01); *F17C 2250/07* (2013.01); *F17C 2260/046* (2013.01); *F17C 2265/037* (2013.01); *F17C 2265/065* (2013.01); *F17C 2270/0139* (2013.01); *F17C 2270/0581* (2013.01); *Y02E 60/321* (2013.01)

(58) Field of Classification Search
CPC ........ F17C 2223/0153; F17C 2223/033; F17C 2223/043; F17C 2223/046; F17C 2225/0123; F17C 2225/036; F17C 2227/0164; F17C 2227/0323; F17C 2227/0353; F17C 2227/0355; F17C 2227/0388; F17C 2227/0393; F17C 2250/01; F17C 2250/043; F17C 2250/0439; F17C 2250/0636; F17C 2250/07; F17C 2260/046; F17C 2265/037; F17C 2265/065; F17C 2270/0139; F17C 2270/0581; B67D 7/58; B67D 7/78; Y02E 60/321
See application file for complete search history.

(56) References Cited

U.S. PATENT DOCUMENTS

| | | | |
|---|---|---|---|
| 10,168,001 B2 * | 1/2019 | Karlsson | .................. F17C 9/04 |
| 2011/0103976 A1 | 5/2011 | Fejzuli | |
| 2013/0125568 A1 | 5/2013 | Chalk et al. | |
| 2013/0340474 A1 | 12/2013 | Jung et al. | |
| 2014/0369858 A1 | 12/2014 | Fejzuli | |
| 2016/0348840 A1 * | 12/2016 | Nagura | ..................... F17C 7/00 |

FOREIGN PATENT DOCUMENTS

| | | | | |
|---|---|---|---|---|
| JP | 2011-517749 A | 6/2011 | | |
| JP | 4816629 B2 | 11/2011 | | |
| JP | 2013-040648 A | 2/2013 | | |
| JP | 2013-108623 A | 6/2013 | | |
| JP | 2014-511469 A | 5/2014 | | |
| JP | 2014-111984 A | 6/2014 | | |
| JP | 2014-238159 A | 12/2014 | | |
| JP | 2015-158213 A | 9/2015 | | |
| WO | WO-2014170314 A1 * | 10/2014 | ....... | B60K 15/03006 |
| WO | 2015/045992 A1 | 4/2015 | | |

OTHER PUBLICATIONS

International Search Report issued in PCT/JP2016/079049; dated Dec. 20, 2016.
Extended European Search Report issued by the European Patent Office dated Apr. 11, 2019, which corresponds to EP16851857.9-1010 and is related to U.S. Appl. No. 15/763,979.

* cited by examiner

GAS SUPPLY DEVICE AND GAS SUPPLY METHOD

TECHNICAL FIELD

The present invention relates to a gas supply device and a gas supply method.

BACKGROUND ART

For example, Patent Literature 1 discloses a hydrogen compression device for use in a hydrogen station. In the hydrogen compression device, a hydrogen compressor, a compressor driving motor, a gas cooler, etc. are disposed on a common base. Hydrogen gas pressurized to a predetermined pressure by stages by the hydrogen compressor is once stored in a pressure accumulator unit. To the pressure accumulator unit, a dispenser is connected. The dispenser is provided with a nozzle adapted to a supply port of a fuel cell vehicle for supplying pressurized hydrogen gas to the fuel cell vehicle.

In a hydrogen compression device such as the hydrogen compression device disclosed in Patent Literature 1 or the like, a gas temperature at a compressor introduction side is, for example, 0° C. to 40° C., according to which temperature, driving of the compressor is appropriately switched. Then, since when a temperature of gas supplied to the compression device is on the order of 0° C. to 40° C., the gas temperature is increased after compression by the compression device, it may be necessary to cool the compressed gas by an after-cooler. Accordingly, cooling of the compressed gas causes generation of power loss.

CITATION LIST

Patent Literature

Patent Literature 1: Japanese Patent Unexamined Publication No. 2013-40648

SUMMARY OF INVENTION

An object of the present invention is to reduce power of a gas supply device.

A gas supply device according to one aspect of the present invention is provided with a storage container that accumulates liquefied gas, a vaporizer for vaporizing liquefied gas derived from the storage container, a compression device that compresses gas vaporized from the liquefied gas in the vaporizer, a pressure accumulator that accumulates gas compressed in the compression device, and a supply path linked to a dispenser from the pressure accumulator.

A gas supply method according to one aspect of the present invention is a method of supplying a dispenser with gas, including causing liquefied gas accumulated in a storage container to flow out of the storage container, vaporizing, in a vaporizer, the liquefied gas flown out from the storage container, compressing, in a compression device, gas vaporized in the vaporizer, and supplying a dispenser with the gas compressed in the compression device directly or via a pressure accumulator.

DESCRIPTION OF EMBODIMENTS

In the following, embodiments of the present invention will be described in detail with reference to the drawings.

Figure 1:
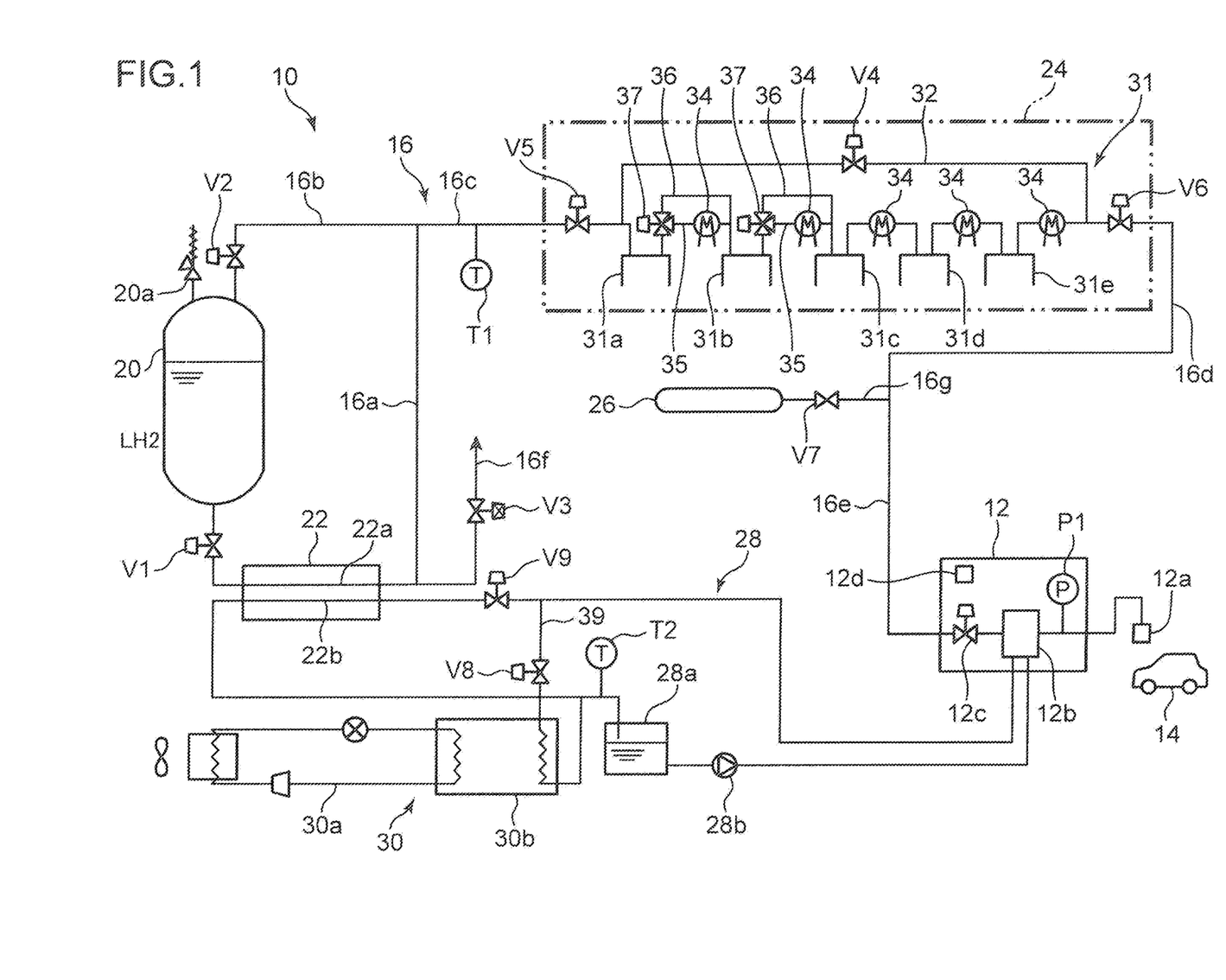
FIG. 1 is a diagram showing a configuration of a gas supply device according an embodiment of the present invention.

As shown in FIG. 1, a gas supply device 10 according to the present embodiment, which is provided in, for example, a hydrogen station as a hydrogen gas supply stand, supplies, according to a charge instruction from a dispenser 12 as a charging facility, hydrogen gas to the dispenser 12 side. The hydrogen station has the gas supply device 10, and the dispenser 12 connected to an outflow end of the gas supply device 10. The dispenser 12 charges a tank provided in a vehicle 14 (a tank mounting device) with hydrogen gas. The vehicle 14 is, for example, a fuel cell vehicle.

The gas supply device 10 has a gas flow path 16 having a gas outflow end connected to the dispenser 12, a storage container 20, a vaporizer 22, a compression device 24, a pressure accumulator 26, a cooling circuit 28, and a refrigerator 30. The storage container 20, the vaporizer 22, the compression device 24, and the pressure accumulator 26 are connected to the gas flow path 16.

The storage container 20 is connected to a gas inflow end in the gas flow path 16. The gas flow path 16 has a liquid side inflow path 16a having a first inflow end, a gas side inflow path 16b having a second inflow end, a suction flow path 16c at which the liquid side inflow path 16a and the gas side inflow path 16b merge so as to be linked to a suction port of the compression device 24, a connection flow path 16d that connects a discharge port of the compression device 24 and the pressure accumulator 26, and a supply path 16e from the pressure accumulator 26 to the gas outflow end.

The storage container 20 accumulates liquefied gas (liquefied hydrogen gas). The first inflow end of the liquid side inflow path 16a is connected to a bottom portion of the storage container 20. The second inflow end of the gas side inflow path 16b is connected to an upper portion of the storage container 20. The storage container 20 is provided with a safety valve 20a.

The liquid side inflow path 16a and the gas side inflow path 16b are respectively provided with switching valves V1 and V2 arbitrarily controllable to conduct switching operation. The suction flow path 16c is provided with a temperature sensor T1 as a means for sensing temperature of gas.

The vaporizer 22 has a gas side flow path 22a connected to the liquid side inflow path 16a and a heating medium side flow path 22b connected to the cooling circuit 28. In the vaporizer 22, liquefied gas flowing in the gas side flow path 22a is heated by a heating medium flowing in the heating medium side flow path 22b to vaporize the liquefied gas.

To the liquid side inflow path 16a, an exhaust path 16f is connected. The exhaust path 16f is provided with a switching valve V3 arbitrarily controllable to conduct switching operation.

The compression device 24 has a compressor 31 that compresses gas, and a detour 32 that detours the compressor 31. The compressor 31 has a plurality of compression portions 31a to 31e. These compression portions 31a to 31e are connected in series. Accordingly, the plurality of compression portions 31a to 31e includes a first compression portion and a second compression portion as a compression portion at a stage subsequent to the first compression portion. The illustrated example includes five compression portions 31a to 31e, of which, for example, the compression portion 31a at a first stage functions as a first compression portion and the compression portion 31b at a second stage functions as the second compression portion. Configuration of the compressor 31 is not limited to that includes the five compression portions 31a to 31e, but may include other number of a plurality of compression portions. Additionally, the configuration may include one compression portion.

The detour 32 is configured to detour all the compression portions 31a to 31e at the first to fifth stage. The detour 32 is provided with a switching valve V4 arbitrarily controllable to conduct switching operation. The compression device 24 is provided with switching valves V5 and V6 arbitrarily controllable to conduct switching operation on both a suction side and a discharge side of the compressor 31.

Each of the compression portions 31a to 31e is configured with a reciprocating compressor that rotates a crank-shaft not shown by driving of a motor not shown, thereby reciprocating a piston. In each of the compression portions 31a to 31e, when hydrogen gas is compressed so that a pressure in a cylinder (compression chamber) becomes equal to or higher than a pressure of a path on the discharge side, a discharge valve not shown opens to discharge the hydrogen gas. Each of the compression portions 31a to 31e is not limited to a reciprocating compressor but may be configured as a compressor of other type.

The compression device 24 has a cooling flow path 35 in which a cooler 34 (after-cooler 34) is provided, a bypass flow path 36 that bypasses the cooler 34, and a switching mechanism 37. The cooling flow path 35 connects the first stage compression portion 31a and the second stage compression portion 31b such that gas discharged from the first stage compression portion 31a is introduced to the second stage compression portion 31b. The bypass flow path 36 is connected to the cooling flow path 35 so as to bypass the cooler 34. The switching mechanism 37 is configured to switch, between the cooling flow path 35 and the bypass flow path 36, connection between the first stage compression portion 31a and the second stage compression portion 31b. In short, the switching mechanism 37 is configured to conduct state switching between a state where gas flows in the cooling flow path 35 and a state where gas flows in the bypass flow path 36. In other words, the switching mechanism 37 switches a state where gas discharged from the first stage compression portion 31a is introduced to the second stage compression portion 31b via the cooler 34 and a state where gas discharged from the first stage compression portion 31a is introduced to the second stage compression portion 31b via the bypass flow path 35. The cooling flow path 35, the bypass flow path 36, and the switching mechanism 37 are provided also between the second stage compression portion 31b and the third stage compression portion 31c. On the discharge sides of the compression portions 31c, 31d, and 31e at the third and the following stages, the coolers 34 are provided.

The cooling flow path 35, the bypass flow path 36, and the switching mechanism 37 are provided between the first stage compression portion 31a and the second stage compression portion 31b, and between the second stage compression portion 31b and the third stage compression portion 31c; however, the cooling flow path 35, the bypass flow path 36, and the switching mechanism 37 may be provided at other positions than these positions. Additionally, the cooling flow path 35, the bypass flow path 36, and the switching mechanism 37 may be provided only one side of these. Additionally, the switching mechanism 37 may be configured with one cross valve or may be configured with switching valves provided in the cooling flow path 35 and the bypass flow path 36, respectively.

The switching mechanism 37 is configured to conduct state switching between a state (a cooling state) where gas flows in the cooling flow path 35 and a state (a non-cooling state) where gas flows in the bypass flow path 36, on the basis of a detection value of the temperature sensor T1 provided in the suction flow path 16c. That is, when the detection value of the temperature sensor T1 is equal to or lower than a predetermined temperature, the switching mechanism 37 enters the non-cooling state. On the other hand, when the detection value of the temperature sensor T1 is equal to or higher than the predetermined temperature, the switching mechanism 37 enters the cooling state.

The pressure accumulator 26 is configured with a pressure container to accumulate gas (hydrogen gas) compressed by the compression device 24. The pressure accumulator 26 may be configured with a plurality of pressure containers or configured with one pressure container. The pressure accumulator 26 is connected to the connection flow path 16d via a branch path 16g branched from the connection flow path 16d. The branch path 16g is provided with a switching valve V7 arbitrarily controllable to conduct switching operation. The switching valve V7 is opened at the time of accumulating gas in the pressure accumulator 26 and at the time of exhausting the gas accumulated in the pressure accumulator 26 and otherwise, the valve is closed.

The dispenser 12 has a nozzle 12a that supplies a tank of the vehicle 14 with gas, a heat exchanger 12b that cools gas flowing toward the nozzle 12a, and a flow rate regulation valve 12c that regulates a flow rate of the gas flowing toward the nozzle 12a. Additionally, the dispenser 12 is provided with a pressure sensor P1 that senses a pressure of gas.

The cooling circuit 28 is a circuit in which a heating medium (brine) is enclosed and is connected to the vaporizer 22 and the heat exchanger 12b. Additionally, the cooling circuit 28 is provided with a heating medium tank (brine tank) 28a and a heating medium pump (brine pump) 28b. Driving the heating medium pump 28b causes a heating medium to circulate in the cooling circuit 28 between the vaporizer 22 and the heat exchanger 12b. The heating medium tank 28a is provided in a part downstream of the vaporizer 22 in a circulation direction of the heating medium. The heating medium tank 28a temporarily accumulates the heating medium cooled by the vaporizer 22.

The refrigerator 30 is provided for cooling a heating medium when cooling of a heating medium by the vaporizer 22 falls short of a cooling capacity. The refrigerator 30 is connected to the cooling circuit 28 so as to be in parallel to the vaporizer 22.

The refrigerator 30 has a refrigerant circuit 30a in which a refrigerant circulates, and a heat exchanger 30b that cools a heating medium of the cooling circuit 28 by the refrigerant of the refrigerant circuit 30a. The refrigerant circuit 30a is configured with, for example, a vapor compression type freezing circuit.

A connection path 39 that connects the cooling circuit 28 and the heat exchanger 30b is provided with a switching valve V8 arbitrarily controllable to conduct switching operation. Additionally, a switching valve V9 arbitrarily controllable to conduct switching operation is provided also in a part between one connection portion of the connection path 39 and the vaporizer 22 in the cooling circuit 28. Additionally, the cooling circuit 28 is provided with a temperature sensor T2 that detects a temperature of a heating medium between the other connection portion of the connection path 39 and the heating medium tank 28a.

Each switching valve, the heating medium pump 28b, the compression device 24, and the refrigerator 30 conduct operation on the basis of an instruction from a controller 12d provided in the dispenser 12.

Here, description will be made of driving operation of the gas supply device 10 according to the present embodiment. Operating the gas supply device 10 leads to the following gas supply method.

Figure 2:
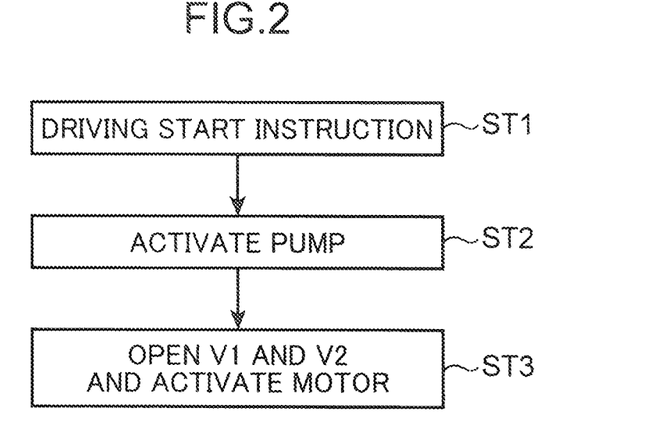
FIG. 2 is a flow chart for explaining basic operation of gas supply driving.

That is, driving of the gas supply device 10 is started on the basis of a driving start instruction from the controller 12d. When the driving start instruction is output from the controller 12d (Step ST1), the heating medium pump 28b is activated (Step ST2). As a result, a heating medium in the cooling circuit 28 circulates. The heating medium sent from the heating medium pump 28b sequentially passes through the heat exchanger 12b in the dispenser 12, the vaporizer 22, and the heating medium tank 28a, and is again sucked into the heating medium pump 28b.

Additionally, in response to the driving start instruction, drive for supplying the dispenser 12 with gas is conducted. In this gas supply driving, first, the switching valve V1 of the liquid side inflow path 16a and the switching valve V2 of the gas side inflow path 16b are opened, and a motor of the compression device 24 is activated (Step ST3). Opening of the switching valve V1 causes liquefied gas (liquid hydrogen) in the storage container 20 to flow out to the liquid side inflow path 16a and pass through the vaporizer 22. In the vaporizer 22, the liquefied gas flowing in the gas side flow path 22a is heated by a heating medium flowing in the heating medium side flow path 22b to be vaporized. The gas vaporized in the heat exchanger 12b flows from the liquid side inflow path 16a to the suction flow path 16c to merge with a gas flowing from the gas side inflow path 16b, and is then sucked in the compression device 24. A temperature of the liquefied gas in the storage container 20 is a temperature on the order of, for example, −253° C., and a temperature of the gas vaporized in the vaporizer 22 becomes on the order of, for example, −200° C. to −100° C. On the other hand, a temperature of the heating medium cooled by the vaporizer 22 becomes on the order of, for example, −70° C. to −60° C.

In the compression device 24, when a pressure of the gas becomes equal to or more than a predetermined pressure, the gas is absorbed in the first stage compression portion 31a. In the compression device 24, the gas is sequentially introduced from the first stage compression portion 31a to the subsequent stage compression portions 31b to 31e and compressed in the compression portions 31a to 31e at the respective stages. For example, the gas introduced at a pressure of less than 1 MPa into the compression device 24 is pressurized to a maximum of 87.5 MPa and is discharged from the compression device 24. When a temperature of a gas introduced into the compression device 24 is on the order of, for example, −100° C., the switching mechanism 37 of the compression device 24 has been switched to the non-cooling state in which the gas flows in the bypass flow path 36. Therefore, the gas compressed by the compression portion 31a and the compression portion 31b will not be cooled by the cooler 34. On the other hand, the gas discharged from the compression portions 31c to e at the third and following stages is cooled by the cooler 34.

The gas discharged from the compression device 24 is introduced into the pressure accumulator 26 and is accumulated in the pressure accumulator 26. The gas in the pressure accumulator 26 is introduced into the dispenser 12. When during gas supply driving, the inside of the pressure accumulator 26 is lowered to a pressure as low as less than a predetermined pressure, or other cases, the gas discharged from the compression device 24 is introduced from the compression device 24 directly into the dispenser 12 without being introduced into the pressure accumulator 26.

In the dispenser 12, the gas flows toward the nozzle 12a while a flow rate of the gas is regulated by the flow rate regulation valve 12c and the gas is cooled in the heat exchanger 12b by a heating medium. This leads to filling the tank of the vehicle 14 with gas at a pressure increasing speed according to a predetermined protocol. In the gas supply driving, according to a detection value obtained by the pressure sensor P1 provided in the dispenser 12, a degree of opening of the flow rate regulation valve 12c is regulated. This leads to adjustment of the pressure increasing speed.

Figure 3:
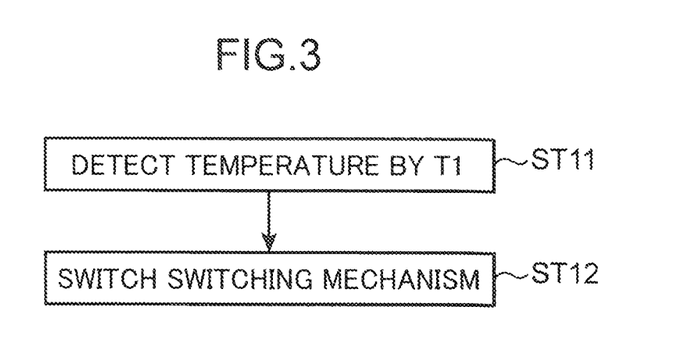
FIG. 3 is a flow chart for explaining switching operation of a switching mechanism in the gas supply driving.

During the gas supply driving, a temperature of gas introduced into the compression device 24 is detected by the temperature sensor T1 (Step ST11). Since a detection value of the temperature sensor T1 is ordinarily equal to or lower than the predetermined temperature, the switching mechanism 37 is in the non-cooling state. Therefore, for example, gas discharged from the first stage compression portion 31a passes through the bypass flow path 36 to be introduced into the second stage compression portion 31b. On the other hand, when the detection value of the temperature sensor T1 becomes higher than the temperature set in advance for some reason or other, the switching mechanism 37 is switched to the cooling state (Step ST12). As a result, the gas discharged, for example, from the first stage compression portion 31a is cooled by the cooler 34 and then sucked into the second stage compression portion 31b. Then, when the detection value of the temperature sensor T1 becomes equal to or lower than the temperature set in advance, the switching mechanism 37 is switched from the cooling state to the non-cooling state.

Figure 4:
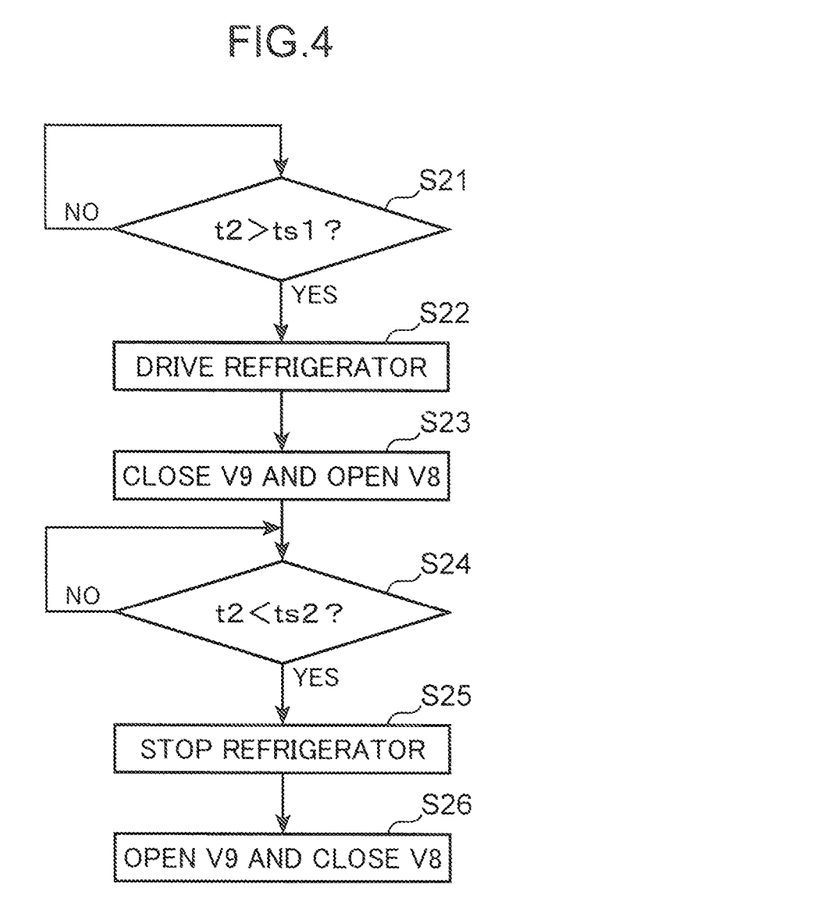
FIG. 4 is a flow chart for explaining refrigerator driving and stopping operations in the gas supply driving.

During the gas supply driving, a temperature of a heating medium accumulated in the heating medium tank 28a is detected by the temperature sensor T2 provided in the cooling circuit 28. With a detection value t2 of the temperature sensor T2 and a temperature set in advance (first threshold value) ts1 being compared (Step ST21), when the detection value t2 of the temperature sensor T2 becomes higher than the temperature set in advance (first threshold value) ts1, the refrigerator 30 is driven (Step ST22). At this time, the switching valve V9 of the cooling circuit 28 is closed and the switching valve V8 of the connection path 39 is opened (Step ST23). This causes the heating medium of the cooling circuit 28 not to pass through the vaporizer 22 but to flow through the heat exchanger 30b of the refrigerator 30. As a result, the heating medium cooled by the refrigerator 30 will be accumulated in the heating medium tank 28a.

On the other hand, when the detection value of the temperature sensor T2 becomes a temperature (second threshold value) ts2, which is a temperature set in advance and lower than the first threshold value ts1 (Step ST24), the refrigerator 30 stops (Step ST25). At this time, the switching valve V9 of the cooling circuit 28 is opened and the switching valve V8 of the connection path 39 is closed (Step ST26). As a result, the heating medium will be introduced into the vaporizer 22 without passing through the refrigerator 30.

The gas supply driving includes compression charging and differential pressure charging. In the compression charging, with the compression device 24 being driven, the tank of the vehicle 14 is charged with gas from the dispenser 12. As a result, to the vaporizer 22, liquefied gas with a flow rate to be sucked into the compression device 24 according to a rotational speed of the motor of the compression device 24 flows. On the other hand, in the differential pressure charging, with the compression device 24 not being driven, the tank is charged with gas from the pressure accumulator 26 due to a pressure difference between the pressure accumulator 26 and the tank of the vehicle 14. In the differential pressure charging, while the compression device 24 is not driven but the switching valve of the exhaust path 16*f* is opened, so that the liquefied gas flows into the vaporizer 22 due to a pressure difference between an internal pressure of the storage container 20 and atmospheric pressure. Accordingly, even when the compression device 24 is not driven, cold energy meeting a necessary gas cooling capacity in the dispenser 12 can be obtained from the vaporizer 22.

As described in the foregoing, in the present embodiment, liquefied gas is vaporized in the vaporizer 22 and the vaporized gas is sucked into the compression device 24 to be compressed. Then, the gas is sent via the pressure accumulator 26 or directly to the dispenser 12. In the present embodiment, since gas which has been vaporized from liquefied gas is used, low temperature gas can be sucked into the compression device 24. Accordingly, it is possible to stop or reduce cooling of gas in the compression device 24 and therefore possible to avoid or suppress generation of a heat loss.

Additionally, in the present embodiment, in the cooling circuit 28, a heating medium circulates between the heat exchanger 12*b* in the dispenser 12 and the vaporizer 22. Therefore, high temperature gas in the dispenser 12 can be cooled by cold energy (cold energy received from the liquefied gas) obtained by the vaporizer 22. That is, since as a cooling source for the gas in the dispenser 12, liquefied gas accumulated in the storage container 20 is used, it is not necessary to newly provide a cooling source. In other words, power necessary for the gas supply device 10 can be reduced. Additionally, since low temperature liquefied gas is used, the gas in the dispenser 12 can be effectively cooled.

Additionally, in the present embodiment, the heating medium cooled by the vaporizer 22 is accumulated in the heating medium tank 28*a*. Accordingly, the cold energy obtained by the vaporizer 22 can be temporarily stored.

Additionally, in the present embodiment, the refrigerator 30 is connected to the cooling circuit 28 so as to be in parallel to the vaporizer 22. It is therefore possible to use the refrigerator 30 as a gas cooling source when cold energy obtained from the vaporizer 22 falls short of a capacity for cooling the gas in the dispenser 12.

Additionally, in the present embodiment, the exhaust path 16*f* is provided which exhausts gas vaporized in the vaporizer 22. Accordingly, even when an amount of gas in the heat exchanger 12*b*, the gas being for obtaining cold energy required for cooling the gas in the dispenser 12, exceeds the amount of gas to be introduced into the compression device 24, only a necessary amount of gas can be introduced to the compression device 24. Additionally, even when the compression device 24 is not driven, the gas in the dispenser 12 can be cooled. Accordingly, the gas in the dispenser 12 can be appropriately cooled.

Additionally, in the present embodiment, since the gas side inflow path 16*b* is provided for guiding the gas in the storage container 20 to the compression device 24, boil-off gas in the storage container 20 can be effectively used.

Additionally, in the present embodiment, since the detour 32 that detours the compressor 31 is provided, gas can be supplied to the dispenser 12 without compressing the gas by the compressor 31.

Additionally, in the present embodiment, when the switching mechanism 37 is switched such that gas discharged from the first stage compression portion 31*a* flows into the second stage compression portion 31*b* via the bypass flow path 36, the gas will not be cooled in the cooler 34. Accordingly, as compared with a case where gas is cooled in the cooler 34, power required in the compression device 24 can be reduced. On the other hand, when a temperature of gas sucked into the first stage compression portion 31*a* becomes high, the switching mechanism 37 is switched such that the gas discharged from the first stage compression portion 31*a* flows into the second stage compression portion 31*b* via the cooling flow path 35. This enables a temperature of gas discharged from the compression device 24 from becoming too high.

The present invention is not limited to the above embodiment but allows for various modifications, improvements, etc. without deviating from the gist thereof. For example, the gas supply device 10 may be used for charging a tank mounting device of other body than a vehicle with hydrogen gas. The gas supply device 10 may be used for supplying other gas than hydrogen gas.

In the embodiment, when a temperature of the heating medium tank 28*a* becomes higher than the first threshold value ts1, the refrigerator 30 is driven without using the vaporizer 22; however, the embodiment is not limited to the case. For example, both the vaporizer 22 and the refrigerator 30 may be used. In this case, the switching valve V3 of the exhaust path 16*f* may be opened to exhaust an excess of gas. Additionally, the vaporizer 22 may be used without using the refrigerator 30. Also in this case, an excess of gas may be exhausted by opening the switching valve V3 of the exhaust path 16*f*.

In the above embodiment, at the time of the differential pressure charging, the switching valve V3 of the exhaust path 16*f* is opened; however, the embodiment is not limited to the case. Even in a case where the compression device 24 is driven, when an amount of cold energy according to a flow rate of gas to be absorbed by driving of the compression device 24 falls short of a capacity for cooling the gas in the dispenser 12, the switching valve V3 of the exhaust path 16*f* may be opened. This enables a flow rate of the gas flowing through the vaporizer 22 to be increased, thereby obtaining cold energy required for the dispenser 12.

In the embodiment, the gas side inflow path 16*b* is provided; however, provision of the gas side inflow path 16*b* may be omitted.

Figure 5:
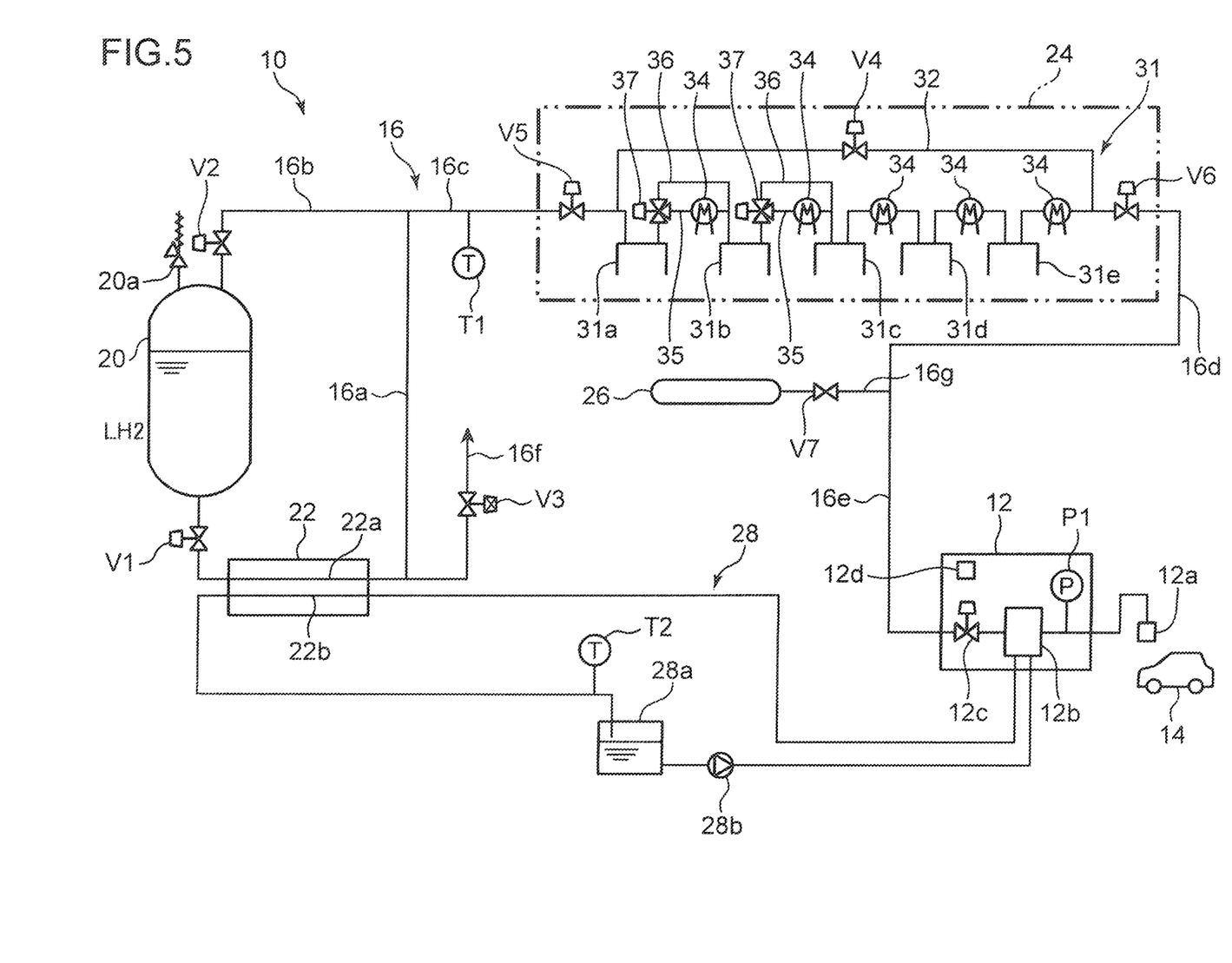
FIG. 5 is a diagram showing a configuration of a gas supply device according to another embodiment of the present invention.

As shown in FIG. 5, provision of the refrigerator 30 may be omitted. In this case, provision of the switching valve V9 of the connection path 39 and the cooling circuit 28 is omitted.

Here, the above embodiment will be outlined.

The gas supply device of the above embodiment is provided with a storage container that accumulates liquefied gas, a vaporizer for vaporizing liquefied gas derived from the storage container, a compression device that compresses gas vaporized from the liquefied gas in the vaporizer, a pressure accumulator that accumulates gas compressed in the compression device, and a supply path linked to a dispenser from the pressure accumulator.

In the present gas supply device, liquefied gas is vaporized in the vaporizer and the vaporized gas is sucked into the compression device to be compressed. Then, the gas is sent via the pressure accumulator or directly to the dispenser. In the present invention, since gas that has been vaporized from liquefied gas is used, low temperature gas can be sucked into the compression device. Accordingly, it is possible to stop or reduce cooling of gas in the compression device and therefore possible to avoid or suppress generation of a heat loss.

The gas supply device may be provided with a cooling circuit in which a heating medium circulates between a heat exchanger that cools gas flowing in the dispenser and the vaporizer.

In this mode, high temperature gas in the dispenser is cooled by cold energy (cold energy received from the liquefied gas) obtained by the vaporizer. That is, since as a cooling source for the gas in the dispenser, liquefied gas accumulated in the storage container is used, it is not necessary to newly provide a cooling source. In other words, power necessary for the gas supply device is reduced. Additionally, since low temperature liquefied gas is used, the gas in the dispenser is effectively cooled.

The cooling circuit may be provided with a heating medium tank in a part downstream of the vaporizer in a circulation direction of the heating medium, the heating medium tank being for temporarily accumulating a heating medium. In this mode, the cooled heating medium is accumulated in the heating medium tank. Accordingly, cold energy obtained in the vaporizer can be temporarily stored.

To the cooling circuit, a refrigerator may be connected so as to be in parallel to the vaporizer. In this mode, it is therefore possible to use the refrigerator as a gas cooling source when cold energy obtained from the vaporizer falls short of a capacity for cooling the gas in the dispenser.

The gas supply device may be provided with an exhaust path that exhausts gas vaporized in the vaporizer. In this mode, even when an amount of gas in the heat exchanger, the gas being for obtaining cold energy required for cooling the gas in the dispenser, exceeds the amount of gas to be introduced into the compression device, only a necessary amount of gas can be introduced to the compression device. Additionally, even when the compression device is not driven, the gas in the dispenser can be cooled. Accordingly, the gas in the dispenser can be appropriately cooled.

To the storage container, a gas side inflow path may be connected for guiding the gas in the storage container to the compression device. In this mode, boil-off gas in the storage container can be effectively used.

The compression device may be provided with a compressor that compresses gas and a detour that detours the compressor. In this mode, gas can be supplied to the dispenser without compressing the gas by the compressor.

The compression device may be provided with a plurality of compression portions including a first compression portion and a second compression portion that is a compression portion at a stage subsequent to the first compression portion, a cooling flow path provided with a cooler, a bypass flow path that bypasses the cooler, and a switching mechanism that switches connection of the first compression portion and the second compression portion between the cooling flow path and the bypass flow path.

In this mode, when the switching mechanism is switched such that gas discharged from the first compression portion flows into the second compression portion via the bypass flow path, the gas will not be cooled in the cooler. Accordingly, as compared with a case where gas is cooled in the cooler, power required in the compression device is reduced.

On the other hand, when a temperature of gas sucked into the first compression portion becomes high, the switching mechanism is switched such that the gas discharged from the first compression portion flows into the second compression portion via the cooling flow path (cooler). This enables a temperature of gas discharged from the compression device from becoming too high.

Additionally, the gas supply method of the above embodiment is a method of supplying a dispenser with gas, including causing liquefied gas accumulated in a storage container to flow out of the storage container, vaporizing, in a vaporizer, the liquefied gas flown out from the storage container, compressing, in a compression device, gas vaporized in the vaporizer, and supplying a dispenser with the gas compressed in the compression device directly or via a pressure accumulator.

In the gas supply method, a heating medium that has cooled the gas in a heat exchanger provided in the dispenser may be introduced into the vaporizer to vaporize the liquefied gas in the vaporizer.

In the gas supply method, when a temperature of gas to be sucked into the compression device is detected becoming a temperature higher than a predetermined temperature, the switching mechanism may be switched such that in the compression device, gas discharged from a compression portion bypasses a cooler.

In the gas supply method, when in a cooling circuit in which the heating medium circulates, a temperature of a heating medium is detected becoming a temperature higher than a predetermined temperature, the heating medium may be cooled by a refrigerator.

In the gas supply method, at least a part of gas vaporized in the vaporizer may be exhausted from an exhaust path.

The invention claimed is:

1. A gas supply device comprising:
a storage container that accumulates liquefied gas;
a vaporizer for vaporizing liquefied gas derived from the storage container;
a compression device that compresses gas vaporized from the liquefied gas in the vaporizer,
a pressure accumulator that accumulates gas compressed in the compression device;
a supply path linked to a dispenser from the pressure accumulator; and
a cooling circuit in which a heating medium circulates between a heat exchanger that cools gas flowing in the dispenser and the vaporizer;
wherein in the cooling circuit, a heating medium tank is provided in a part downstream of the vaporizer in a circulation direction of a heating medium, the heating medium tank temporarily accumulating a heating medium.

2. The gas supply device according to claim 1, wherein a refrigerator is connected to the cooling circuit so as to be in parallel to the vaporizer.

3. The gas supply device according to claim 1, wherein an exhaust path that exhausts gas vaporized in the vaporizer is provided.

4. The gas supply device according to claim 1, wherein a gas side inflow path that guides gas in the storage container to the compression device is connected to the storage container.

5. The gas supply device according to claim 1, wherein the compression device comprises:
a compressor that compresses gas; and
a detour that detours the compressor.

6. The gas supply device according to claim 1, wherein the compression device comprises:
   a plurality of compression portions including a first compression portion, and a second compression portion that is a compression portion at a stage subsequent to the first compression portion;
   a cooling flow path provided with a cooler;
   a bypass flow path that bypasses the cooler; and
   a switching mechanism that switches connection of the first compression portion and the second compression portion between the cooling flow path and the bypass flow path.

7. A gas supply method of supplying a dispenser with gas, the method comprising:
   causing liquefied gas accumulated in a storage container to flow out of the storage container;
   vaporizing, in a vaporizer, the liquefied gas flown out from the storage container;
   compressing, in a compression device, gas vaporized in the vaporizer; and
   supplying a dispenser with the gas compressed in the compression device directly or via a pressure accumulator, and
   circulating a heating medium in a cooling circuit between a heat exchanger that cools gas flowing in the dispenser and the vaporizer,
   wherein in the cooling circuit, a heating medium tank is provided in a part downstream of the vaporizer in a circulation direction of a heating medium, the heating medium tank temporarily accumulating a heating medium.

8. The gas supply method according to claim 7, wherein a heating medium that has cooled the gas in a heat exchanger provided in the dispenser is introduced into the vaporizer to vaporize the liquefied gas in the vaporizer.

9. The gas supply method according to claim 7, wherein when a temperature of gas to be sucked into the compression device is detected becoming a temperature higher than a predetermined temperature, a switching mechanism is switched such that in the compression device, gas discharged from a compression portion bypasses a cooler.

10. The gas supply method according to claim 7, wherein when in a cooling circuit in which the heating medium circulates, a temperature of a heating medium is detected becoming a temperature higher than a predetermined temperature, the heating medium is cooled by a refrigerator.

11. The gas supply method according to claim 7, wherein at least part of gas vaporized in the vaporizer is exhausted from an exhaust path.

\* \* \* \* \*